United States Patent
Chen et al.

(10) Patent No.: US 9,126,292 B2
(45) Date of Patent: Sep. 8, 2015

(54) METHOD AND DEVICE FOR COATING TURBINE COMPONENTS

(75) Inventors: Jianqiang Chen, Greenville, SC (US); Ronald Ralph Cairo, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 596 days.

(21) Appl. No.: 13/072,933

(22) Filed: Mar. 28, 2011

(65) Prior Publication Data

US 2012/0248070 A1   Oct. 4, 2012

(51) Int. Cl.
 *B23K 9/04*   (2006.01)
 *B23P 6/00*   (2006.01)
 *F01D 5/00*   (2006.01)

(52) U.S. Cl.
 CPC .............. *B23P 6/007* (2013.01); *F01D 5/005* (2013.01); *F05D 2230/31* (2013.01); *F05D 2230/80* (2013.01); *F05D 2230/90* (2013.01)

(58) Field of Classification Search
 CPC ........ C21D 10/00; C21D 10/005; C21D 1/04; B24B 1/04; B24B 35/00
 USPC ............... 219/69.1–77; 204/298.01; 451/165, 451/910; 118/620; 427/540, 580
 See application file for complete search history.

(56) References Cited

U.S. PATENT DOCUMENTS

| | | | |
|---|---|---|---|
| 3,268,705 A * | 8/1966 | Inoue | 219/76.13 |
| 3,277,266 A * | 10/1966 | Blaszkowski | 219/76.13 |
| 4,728,488 A | 3/1988 | Gillett et al. | |
| 6,417,477 B1 * | 7/2002 | Brown et al. | 219/76.13 |
| 6,447,569 B1 * | 9/2002 | Sueta | 75/230 |
| 6,835,908 B2 | 12/2004 | Bailey et al. | |
| 7,300,708 B2 | 11/2007 | Gigliotti, Jr. et al. | |
| 2004/0140292 A1 * | 7/2004 | Kelley et al. | 219/76.13 |
| 2004/0182826 A1 * | 9/2004 | Bailey et al. | 219/76.13 |
| 2005/0207896 A1 | 9/2005 | Gigliotti, Jr. et al. | |

OTHER PUBLICATIONS

Nickel titanium, Wikipedia, Oct. 6, 2009, http://en.wikipedia.org/wiki/Nickel_titanium.
Electro-Spark Deposition (ESD) process, Plasma Jet the Outer Limits, Nov. 16, 2008, http://www.plasmajet.ro/en/content/electro-spark-deposition.
Nitinol Crystalline Structure, http://www.imagesco.com/articles/nitinol/03.html, Nov. 1, 2004.

* cited by examiner

*Primary Examiner* — Tu B Hoang
*Assistant Examiner* — Diallo I Duniver
(74) *Attorney, Agent, or Firm* — McNees, Wallace & Nurick, LLC

(57) ABSTRACT

A method and portable device for modifying or coating a surface of turbine components in the field includes an ESD torch electrically connected with ESD equipment. The ESD torch includes an inert gas source, vibration source, and electrode disk of conductive material. The electrode disk is disposed within the ESD torch, shielded by an inert gas and coupled with the vibration source. The electrode disk is rolled over the surface, which actuates the electrode disk and deposits the conductive material from the electrode disk onto the surface of the workpiece to form the compositionally controlled protective coating. The compositionally controlled protective coating deposited by the electrode disk forms a metallurgical bond with the surface of the workpiece to prevent erosion of the workpiece.

18 Claims, 6 Drawing Sheets

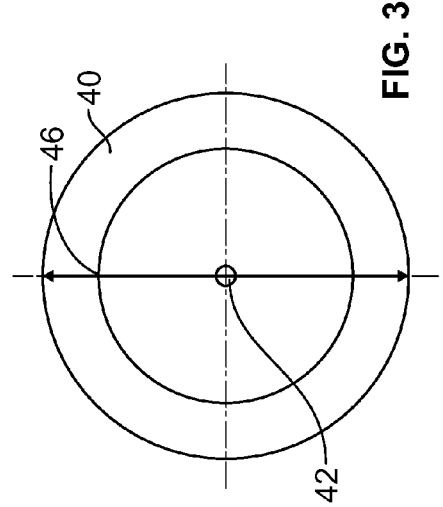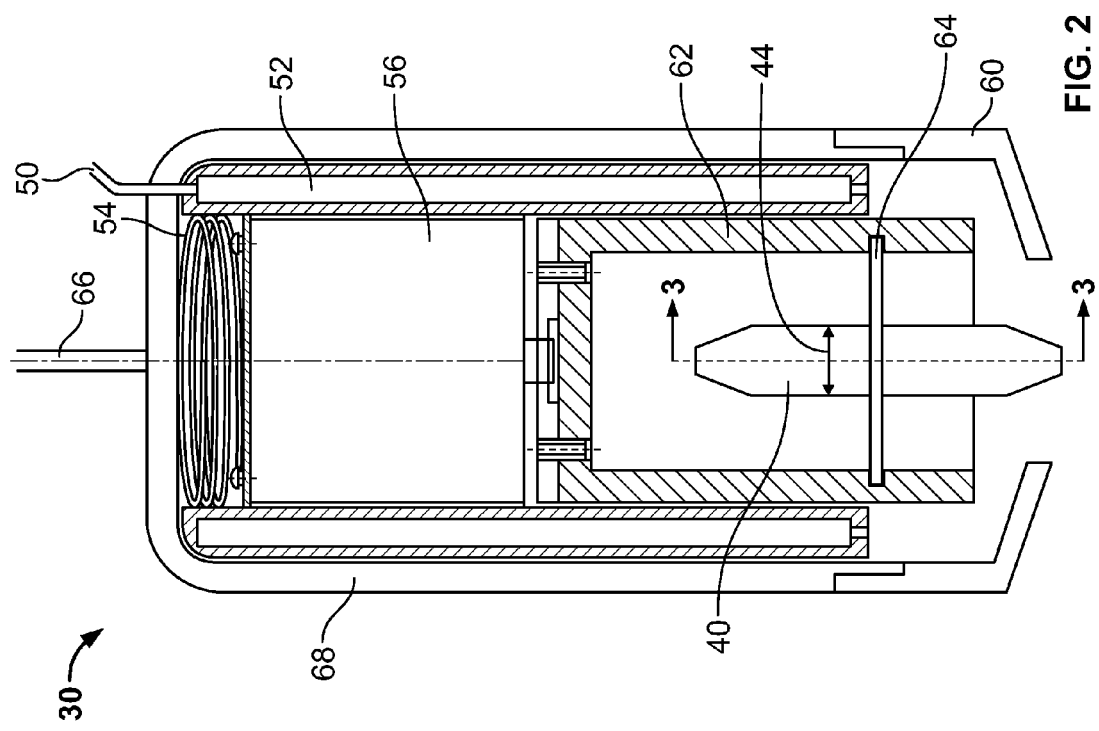

METHOD AND DEVICE FOR COATING TURBINE COMPONENTS

FIELD OF THE INVENTION

The present invention relates generally to turbine components, and more specifically to a method and device for restoring and providing a compositionally controlled protective erosion resistant coating for gas turbine and steam turbine components damaged from water and particle impingement wear.

BACKGROUND OF THE INVENTION

Erosion damage to gas and steam turbine airfoil components from water droplet impingement and/or hard particle impingement wear during operation results in significant economic losses to the power generation industry. The economic losses are a result of aerodynamic efficiency loss, production downtime, and the costs associated with damaged component refurbishment or replacement. Damage to gas turbine compressor blades by water droplet erosion has become a significant issue since wet compression technologies (SPRITS, Water Evaporate Cooling of inlet air) were introduced to restore turbine efficiency. Water droplet erosion has resulted in many compressor operational issues and has prevented the power generation industry from fully utilizing wet compression technologies. A number of methods have been developed to try to provide erosion resistant coatings on gas and steam turbine components, using various deposition techniques. However, many of these methods still suffer from the above described drawbacks.

Electrospark deposition (ESD) is a pulsed-arc, microwelding process that uses short-duration, high-current electrical pulses to deposit a consumable electrode material on a conductive workpiece. ESD processes generally involve very high spark frequencies with the spark duration lasting only a few microseconds. ESD generally, and usually requires manual control or preprogramming of the process parameters. Significantly, depositions result in very little heat input because heat is generated during less than 1% of a weld cycle and dissipated during 99% of the cycle. ESD coatings are extremely dense and metallurgically bonded to the workpiece.

Alternative deposition techniques for material repair and protection include high-velocity oxygen fuel (HVOF) thermal spray, physical vapor deposition (PVD), chemical vapor deposition (CVD), and electrolytic hard chrome (EHC) plating. In contrast to most of the above-mentioned techniques, which may produce mechanical or chemical bonds with a workpiece, ESD creates a true metallurgical bond while maintaining the workpiece at or near ambient temperatures. Deposition methods such as sputtering, thermal spay, and plasma vapor deposition form an unreliable physical bond between the coating and component base metal. The coating deposited by these methods readily spalls off from the component surface thereby providing only temporary erosion protection. In addition, the required stoichiometry or tight control of the coating composition is easily violated by unwanted reactions during application of the sputtering, thermal spay, and plasma vapor deposition processes.

One of the distinguishing aspects of ESD, as compared to other arc-welding processes, is that the electrode contacts the surface rather than maintaining a stand-off distance to control the arc. Fusion welding (e.g., laser welding or arc welding) and brazing processes will thermally affect the component causing material property debits, a heat affected zone and unacceptable distortion. Additionally, when using fusion welding or other thermal fusion processes (arc weld, laser, etc.) for depositing a coating it is impossible to achieve tight control of the coating composition. The fusion welding or thermal fusion processes fuse both filler and parent metal which results in a mixture of filler and parent metal in the deposited coating, which prevents tight control of the final coating composition.

A drawback to conventional electrospark deposition devices is that it employs an electrode rod, which is required to have a sharp tip for generating electrical discharges or sparks. When using conventional ESD devices it is almost impossible to produce uniform and high quality coatings on any irregular or highly contoured surface such as the leading edge surface of a blade of a gas turbine.

Therefore a method of modifying and coating steam or gas turbine components using a portable ESD device that allows for the deposition of a compositionally controlled protective coating does not suffer from the above drawbacks is desirable in the art.

SUMMARY OF THE INVENTION

According to an exemplary embodiment of the present disclosure, a method for modifying a workpiece is provided. The method includes providing the workpiece having a first surface, preparing the first surface of the workpiece, and providing a portable coating device. The portable coating device includes electro-spark deposition (ESD) equipment and an ESD torch electrically connected with the ESD equipment. The ESD torch includes an inert gas source, a vibration source, and an electrode disk including a conductive material. The electrode disk is disposed within the ESD torch, operably coupled with the vibration source, and shielded by the inert gas. The electrode disk is used to apply a compositionally controlled protective coating to the first surface of the workpiece. The method includes a continuous process of rolling the electrode disk of the ESD torch over the first surface, wherein rolling deposits the conductive material from the electrode disk onto the first surface to form the compositionally controlled protective coating. The compositionally controlled protective coating forms a metallurgical bond with the first surface of the workpiece.

According to another exemplary embodiment of the present disclosure, a method for coating a workpiece is provided. The method includes providing the workpiece having a surface and providing a portable coating device. The portable coating device includes ESD equipment and an ESD torch electrically connected to the ESD equipment. The ESD torch includes an inert gas source, a vibration source, and an electrode disk. The electrode disk includes a conductive material and is disposed within the ESD torch. The electrode disk is operably coupled with the vibration source and shielded by the inert gas. In operation, the electrode disk applies a compositionally controlled protective coating to the surface of the workpiece. The method includes a continuous process of rolling the electrode disk of the ESD torch over the surface, wherein rolling deposits the conductive material from the electrode disk onto the surface to form the compositionally controlled protective coating. The compositionally controlled protective coating forms a metallurgical bond with the surface of the workpiece.

According to another exemplary embodiment of the present disclosure, a portable coating device is provided. The coating device includes ESD equipment and an ESD torch electronically connected with the ESD equipment. The ESD torch includes an inert gas source, a vibration source, and an electrode disk. The electrode disk is disposed within the ESD torch and operably coupled with the vibration source and shielded by the inert gas. The electrode disk applies a compositionally controlled protective coating to a surface of a workpiece.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 2 is a cross-sectional view taken along line 2-2 of the ESD torch shown in FIG. 1.

FIG. 3 is a top view cross-sectional view taken along line 3-3 of the electrode disk in FIG. 2.

Wherever possible, the same reference numbers will be used throughout the drawings to represent the same parts.

DETAILED DESCRIPTION OF THE INVENTION

Provided is an apparatus and method of modifying and coating turbine components using a portable ESD device that does not suffer from the drawbacks in the prior art and provides a coating that is resistant to erosive wear.

Figure 1:
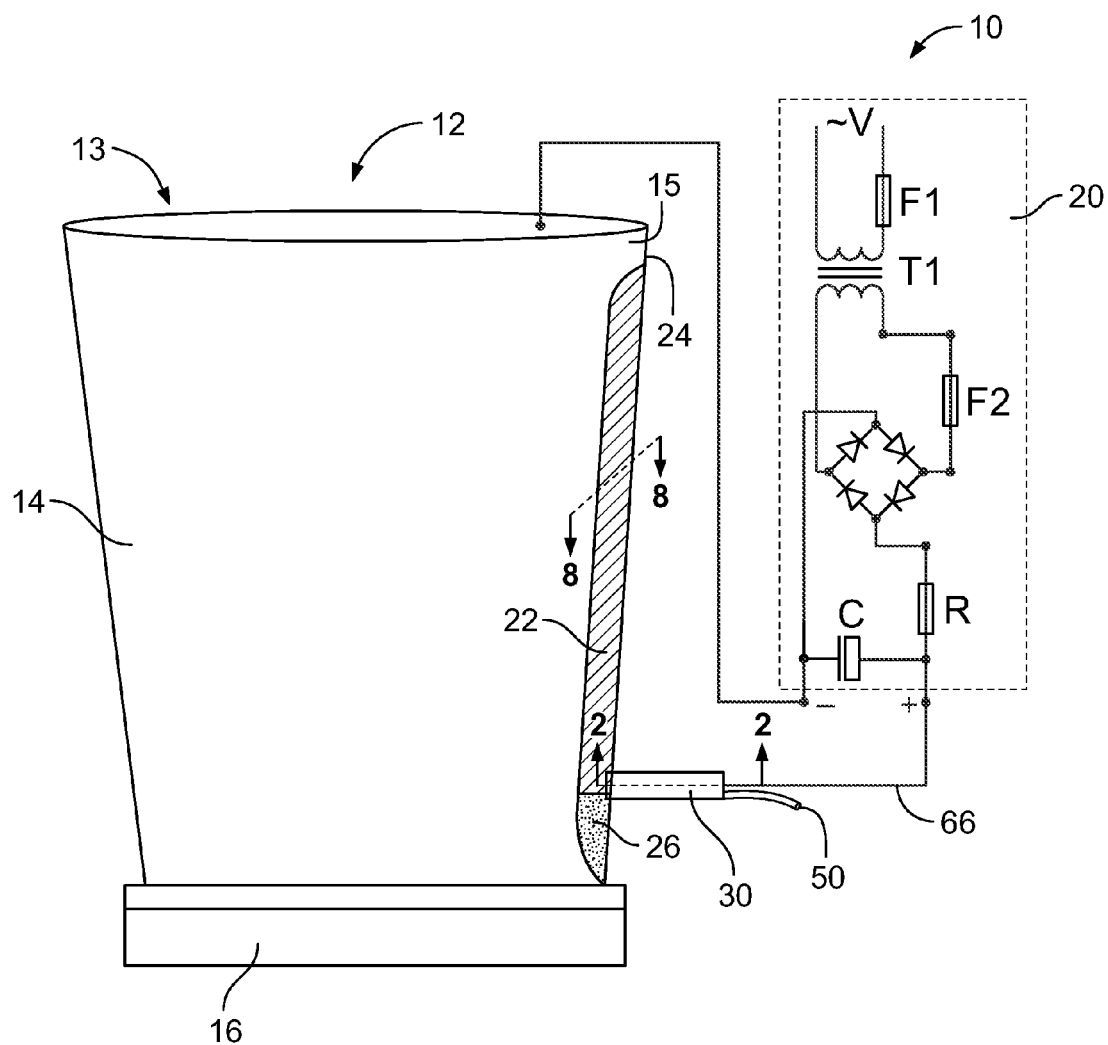
FIG. 1 is schematic illustration of a portable coating device and workpiece of the present disclosure.

FIG. 1 is a schematic illustration of a portable coating device 10 of the present disclosure. The portable coating device 10 includes any commercially available electro-spark deposition (ESD) equipment 20, an ESD torch 30 electrically connected with the ESD equipment 20, and an inert shielding gas line 50. In one embodiment, the workpiece 12 is selected from gas turbine or steam turbine components 13, such as, but not limited to gas turbine compressor blades, gas turbine blade leading edges, gas turbine dovetail load bearing surfaces, steam turbine compressor blades, steam turbine blade leading edges, and steam turbine dovetail load bearing surfaces.

In one embodiment, as shown in FIG. 1, the workpiece 12 is a gas turbine blade 14 with dovetail 16. The leading edge 15 of the turbine blade 14 includes a first surface 24 (also see FIG. 6). The first or damaged surface 24 results from any erosion damage from water and/or particle impingement or wear typical from the operating conditions in gas turbines. Prior to using the portable coating device 10 the first surface 24 must be prepared. The first surface 24 is prepared using conventional cleaning and polishing methods known in the art, such as but not limited to, abrasive amines and acetone, to arrive at a prepared surface 22. Prior to application of the compositionally controlled protective coating 26 using the portable coating device 10, the prepared surface 22 is subject to nondestructive inspection to verify that here are no sub-surface defects in the workpiece 12. After cleaning and inspecting a multilayer compositionally controlled protective coating 26 is built up on the prepared surface 22 of the workpiece 12 using an ESD process with the portable coating device 10.

FIG. 2 is a cross-sectional view taken along line 2-2 of the ESD torch 30 of the portable coating device 10 shown in FIG. 1. The ESD torch 30 is electrically connected to the ESD equipment 20 by an electrical connection 66. The electrical connection 66 provides an electrical conduit from the ESD equipment 20 to the ESD torch 30. The electrical current allows the ESD torch 30 to generate a spark to melt a portion of the electrode disk 40. The ESD torch 30 is used to apply the compositionally controlled protective coating 26 to the surface 22 of the workpiece 12. In one embodiment, the ESD equipment 20 generally operates at approximately 100 Hertz and above and has a voltage of approximately 220 Volts to approximately 240 Volts. In one embodiment, the ESD equipment 20 includes a conventional ESD power source, which incorporates either a series of capacitors or a silicon controlled rectifier coupled with isolated gate bipolar transistor switches. The deposition rate for the ESD equipment 20 using the ESD torch 30 varies depending on the application speed determined by the user.

As shown in FIG. 2, the ESD torch 30 includes a non-conductive housing 68 of suitable insulative material, for example, but not limited to, ceramic materials. The non-conductive housing surrounds the components in the ESD torch 30 and allows an operator to use the ESD torch 30 without being shocked. The ESD torch 30 includes a spring 54 operably coupled with a vibration source 56. The spring 54 and electromagnetic force generated by the vibration source 56 creates linear vibration in a controlled direction. In one embodiment, the vibration source 56 is a linear magnetic vibrator 56. The vibration source 56 is operably coupled with spring 54 and electrode disk holder 62. The vibration source 56 is generally selected from materials that are conductive, such as, but not limited to, copper or copper alloys and other conductive metals. The electrode disk holder 62 is generally constructed from any suitable conductive material, such as, but not limited to, copper or copper alloys. In one embodiment, the electrode disk holder 62 surrounds the electrode disk 40 and holds the electrode disk 40 in place with a conductive pin 64. The conductive pin 64 is generally constructed from the same or similar material as the electrode disk holder 62. The conductive pin 64 allows for easy removal of the electrode disk 40 from the ESD torch 30. In operation, the vibration source 56 causes the electrode disk holder 62 to vibrate, which in turn vibrates the electrode disk 40 and creates an air gap between electrode disk 40 and workpiece 12. The air gap between the electrode disk 40 and workpiece 12 allows a high energy electric charge to build and discharge creating a spark. This electro-spark creates a brief high temperature event which atomizes the electrode material which is then deposited on workpiece 12. An inert shielding gas lens 52 and inert shielding gas line 50 are also included in the non-conductive housing 68 of the ESD torch 30. In one embodiment, the inert shielding gas is selected from helium, argon or a combination thereof. The inert shielding gas protects the electrode disk 40 material deposits 32 from oxidation or other adverse reactions caused by atmospheric gases.

As shown in FIG. 3, the electrode disk 40 is substantially disk shaped and is generally dimensioned to fit the surface of the workpiece 12 being repaired or coated. In one embodiment, the electrode disk 40 includes a thickness 44 (see FIG. 2) and a nominal diameter 46. The nominal diameter 46 is varied depending on size of the workpiece 12 and is approximately 6.35 millimeters (0.25 inches) to approximately 25.40 millimeters (1.00 inch) or alternatively approximately 12.70 millimeters (0.50 inches) to approximately 22.86 millimeters (0.90 inches) or alternatively approximately 15.24 millimeters (0.60 inches) to approximately 20.32 millimeters (0.80 inches). The thickness 44 of the electrode disk 40 is varied depending on size and geometry of the workpiece 12 and is approximately 3.175 millimeters (0.125 inches) to approximately 12.7 millimeters (0.50 inches) or alternatively approximately 6.35 millimeters (0.25 inches) to approximately 10.16 millimeters (0.40 inches) or alternatively approximately 6.35 millimeters (0.25 inches) to approximately 7.62 millimeters (0.30 inches). In one embodiment, the electrode disk 40 optionally includes an aperture 42 for receiving the conductive pin 64 or other securing means device to hold the electrode disk 40 in place in the ESD torch 30.

In one embodiment, the electrode disk 40 is selected from any suitable erosion resistant materials that are conductive, for example, but not limited to, nitinol, conductive cobalt based alloys such as, but not limited to, Stellite 6, Stellite 21, conductive carbides, and combinations thereof. In an alternative embodiment, when the material for the electrode disk 40 is selected from nitinol, the atomic percent of the nitinol is approximately 50.2 to approximately 50.8 atomic percent nickel and the balance titanium. In one embodiment, the portable device 10 including the nitinol electrode disk 40 having approximately 50.2 to approximately 50.8 atomic percent nickel (Ni) and the balance titanium (Ti) provides near equiatomic compositions of Ni and Ti which are maintained in the deposited protective erosion resistant coating 26 on the workpiece 12.

Figure 4:
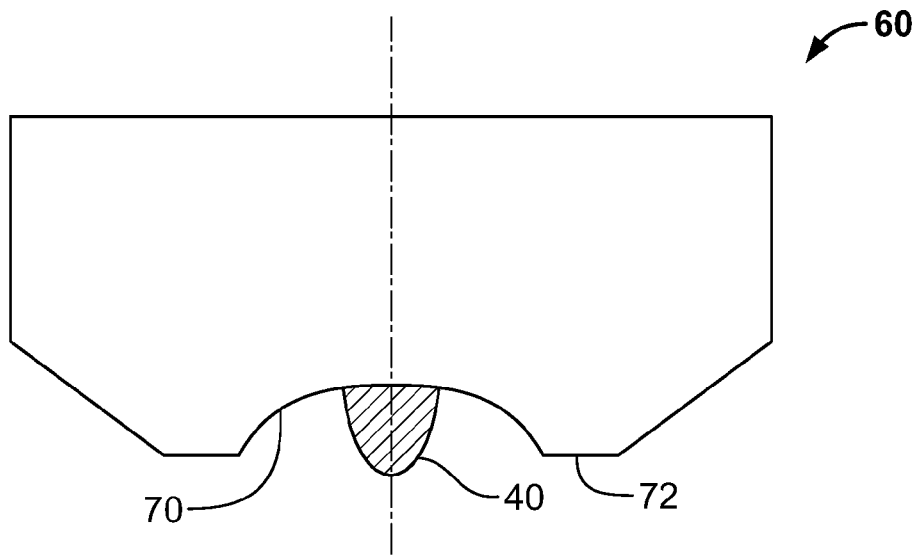
FIG. 4 is a front view of the torch cup of the ESD torch of the present disclosure.
Figure 5:
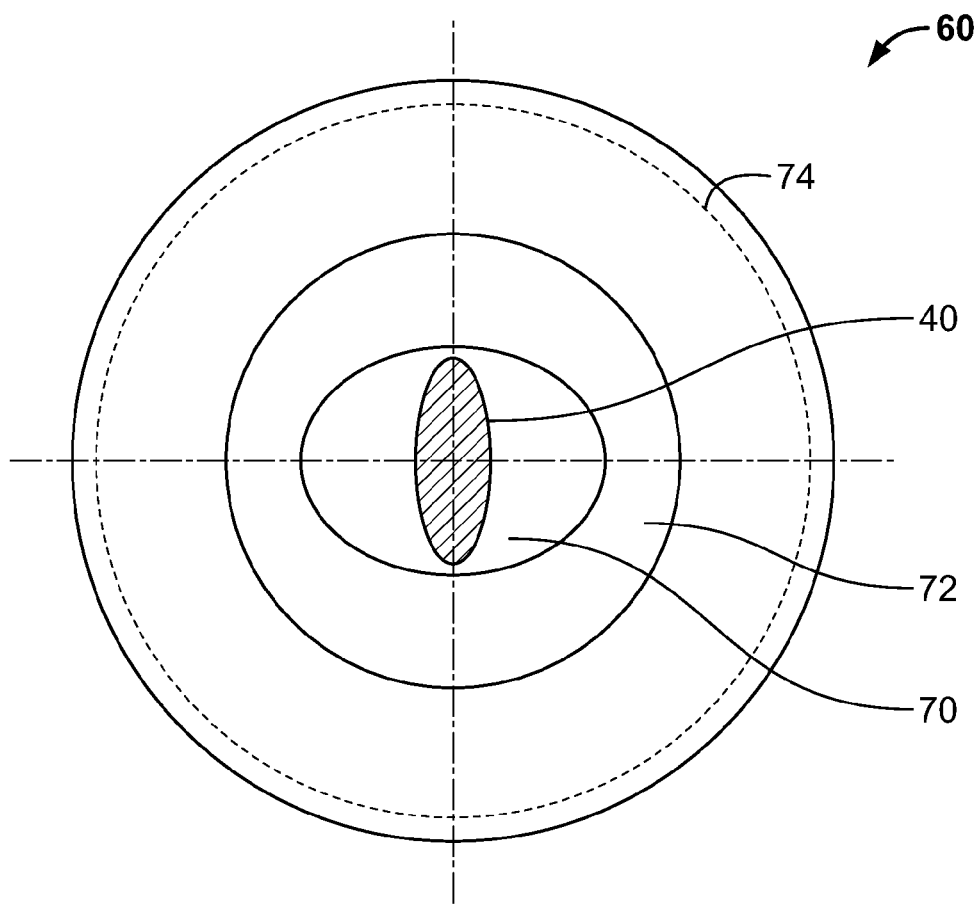
FIG. 5 is a top view of the torch cup of the ESD torch of the present disclosure.

As shown in FIGS. 4 and 5, the electrode disk 40 is surrounded by a torch cup 60. The torch cup 60 is attached to the non-conductive housing 68 of the ESD torch 30 by any suitable attachment means. The torch cup 60 is constructed from a non-conductive housing 74. The non-conductive housing 74 is selected from material, such as, but not limited to, ceramics and other suitable non-conductive materials. The torch cup 60 is easily removed from the ESD torch 30 and allows for easy access and removal of the electrode disk 40 from the ESD torch 30. The torch cup 60 includes a contoured opening 70. The contoured opening 70 is dimensioned to substantially conform to the workpiece 12 being coated. The contoured opening of the torch cup 60 allows the electrode disk 40 to roll over the prepared surface 20 of the workpiece 12. The torch cup 60 also includes guides 72 for operation of the ESD torch 30. The guides 72 are sized and positioned to allow the electrode disk 40 and electrode torch 30 to follow the outer dimensions of the contour of the workpiece 12 being repaired or coated.

Figure 6:
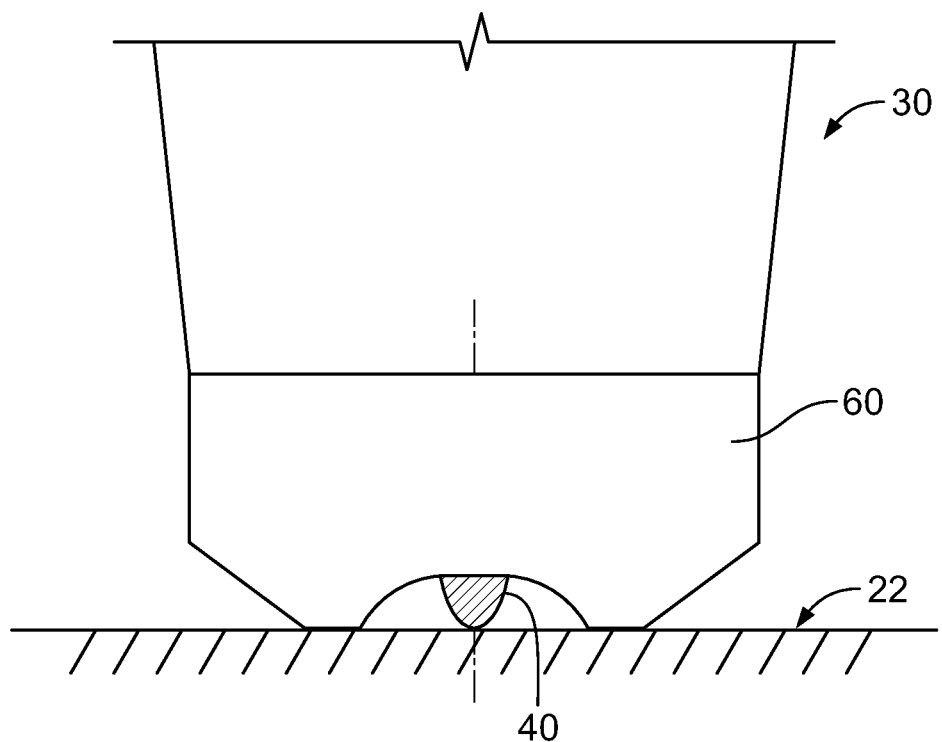
FIGS. 6 and 7 are schematic views of the ESD torch and electrode disk of the present disclosure.
Figure 7:
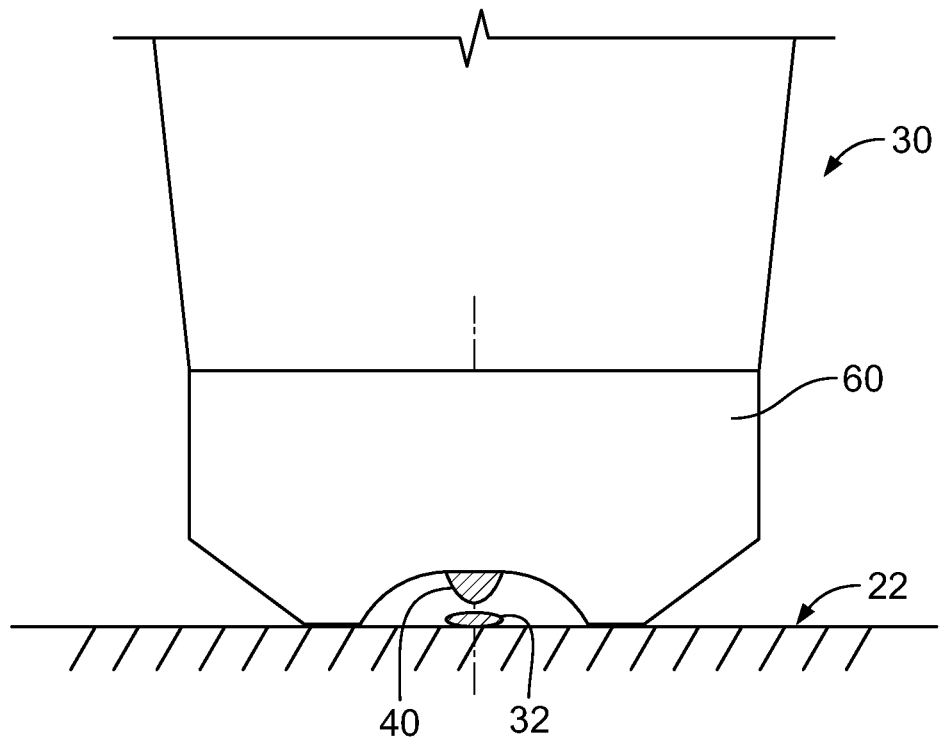

As shown in FIGS. 6 and 7 the electrode disk 40 is designed to roll over the prepared surface 22. In one embodiment, the portable coating device 10 employs a high frequency and high current electrical discharge process that deposits material 32 from the electrode disk 40 on the prepared surface 22 of the workpiece 12 without creating any noticeable thermal distortion and/or heat-effected zones on the prepared surface 22 of the workpiece 12. A uniform compositionally controlled protective coating 26 (see FIGS. 1 and 9) is produced on the prepared surface 22 of the workpiece 12 through material deposits 32 from the electrode disk 40 while the electrode disk 40 rolls over or on the prepared surface 22. The ESD torch 30 containing the electrode disk 40 generates electrical discharges or sparks through the ESD equipment 20. The electrical discharge or spark flows through the components of the ESD torch 30 to the electrode disk 40. Each electrical discharge causes a portion of the material from the electrode disk 40 touching the prepared surface 22 to melt. As the electrode disk 40 rolls along the prepared surface 22, the bond between the workpiece 12 and the electrode disk 40 is interrupted leaving a material deposit 32 from the electrode disk 40 on the workpiece 12 surface at the point where the electrode disk 40 just passed, see FIG. 7. The material deposits 32 from the electrode disk 40 as it rolls along the prepared surface 22 are join together as each material deposit 32 is applied to the prepared surface 22 to form a compositionally controlled protective coating 26 on the prepared surface 22 of the workpiece 12, see FIGS. 1 and 9.

The thickness of the material deposit 32 varies depending on the deposition rate of the ESD torch 30. The portable coating device 10 is used to make multiple passes along prepared surface 22 of the workpiece 12 until the desired compositionally controlled protective coating 26 thickness is produced. To achieve effective erosion resistance, the thickness of the compositionally controlled protective coating 26 after multiple passes is approximately 50.8 microns (0.0020 inches) to approximately 127.0 microns (0.0050 inches), or alternatively 63.5 microns (0.0025 inches) to approximately 114.3 microns (0.0045 inches), or alternatively approximately 76.2 microns (0.0030 inches) to approximately 101.6 microns (0.0040 inches).

Figure 8:
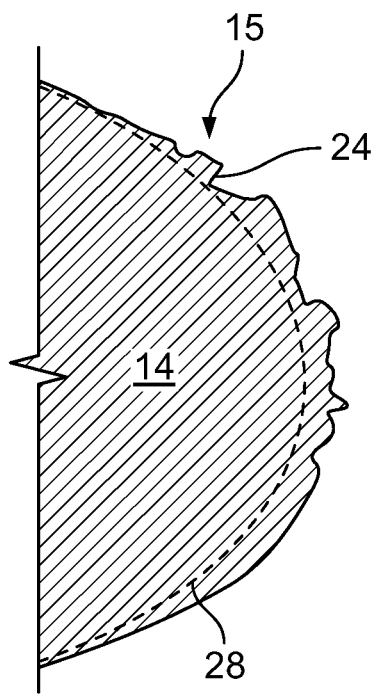
FIG. 8 is a transverse cross section of the blade leading edge exhibiting erosion damage along line 8-8 of FIG. 1 of the present disclosure.
Figure 10:
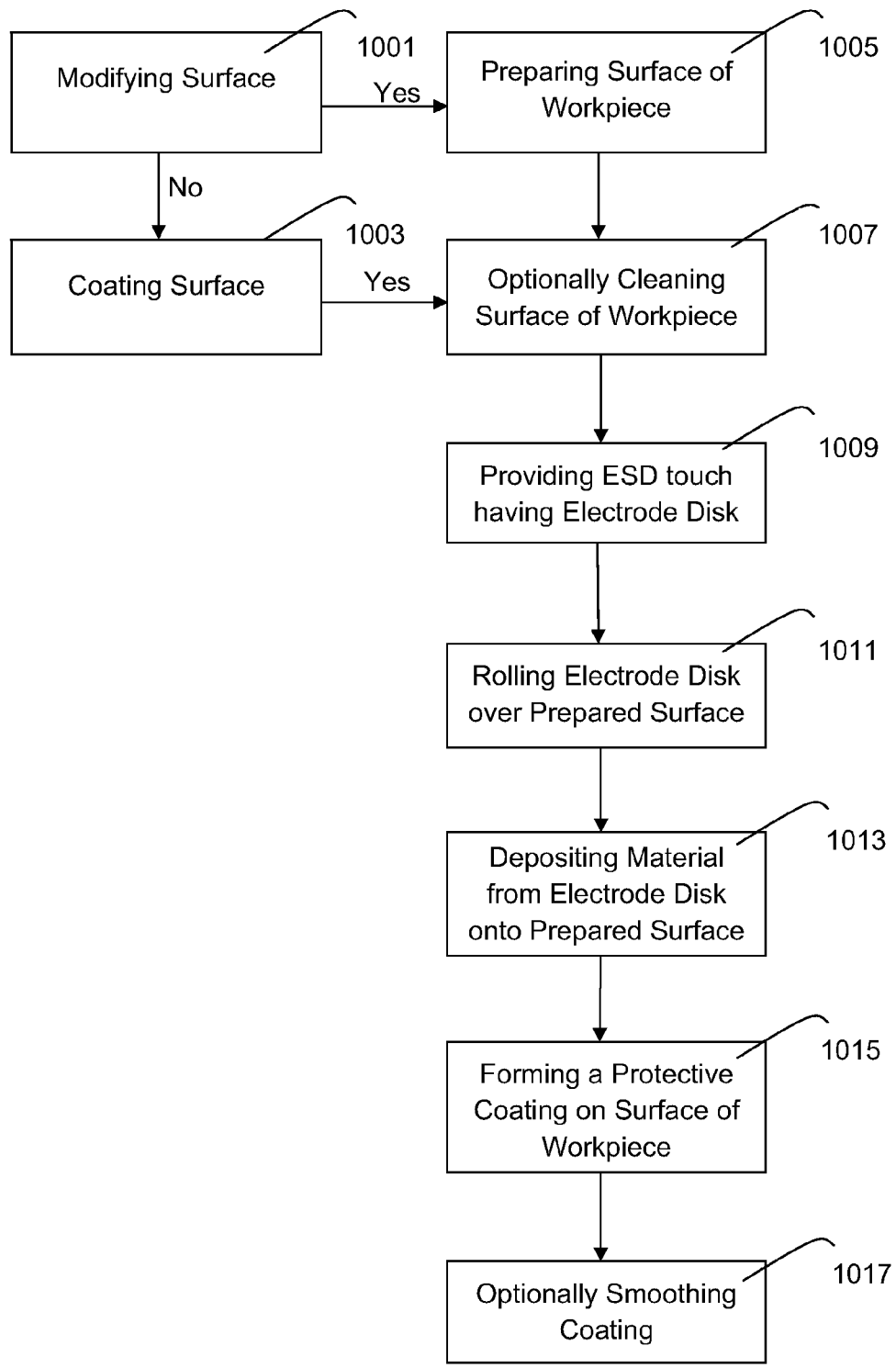
FIG. 10 is a flow diagram of the method of repairing or coating of the present disclosure.

FIG. 10 is a flow diagram of the method of repairing and the method of coating of the present disclosure. First, it is determined if the surface is to be repaired, step 1001. If it is determined that the surface needs to be repaired, then to step 1005. If the surface does not need to be repaired, then to step 1003. If the surface needs to be repaired, under step 1005, the surface is prepared. Preparing the surface includes using any suitable techniques, such as for example, but not limited to grinding the surface of the workpiece 12 to remove the damage 24. As shown in FIG. 8, the area to be removed is shown by the dotted line and labeled with reference numeral 28, to create a prepared surface 22. The step of preparing the surface, step 1005, also includes non-destructive inspection of the workpiece 12 to ensure that no sub-surface defects are present before proceeding.

Included in both the method of coating and the method of repairing is an optional step of cleaning the workpiece 12, step 1007. The step of optionally cleaning or polishing the workpiece 12, step 1007, includes, but is not limited to, using commercially available abrasive amines and acetone. Next, the ESD torch 30 having an electrode disk 40, is provided, step 1009. The electrode disk 40 is rolled over the prepared surface 22, step 1011. The step of rolling, step 1011, results in material deposits 32 from the electrode disk 40 being deposited onto the prepared surface 22, step 1013. In one embodiment, when the electrode disk 40 is selected from nitinol, each electrical discharge from the ESD torch 30 produces an extremely small nitinol deposit that rapidly solidifies on the surface of the workpiece 12. Steps 1011 and 1013 are repeated until a desired coating thickness is obtained on the workpiece 12, thereby forming a compositionally controlled protective coating 26 on the surface of the workpiece 12, step 1015. In one embodiment, a multilayer compositionally controlled protective coating 26 of nitinol, with a thickness of approximately of 100 microns or greater is built up on a workpiece 12, such as, but not limited to, a leading edge 15 or dovetail surface 16 of a gas turbine component 13 (see FIGS. 1 and 9). Optionally, the compositionally controlled protective coating 26 is smoothed using conventional techniques to obtain the desired surface characteristics, such as surface finish, step 1017.

Figure 9:
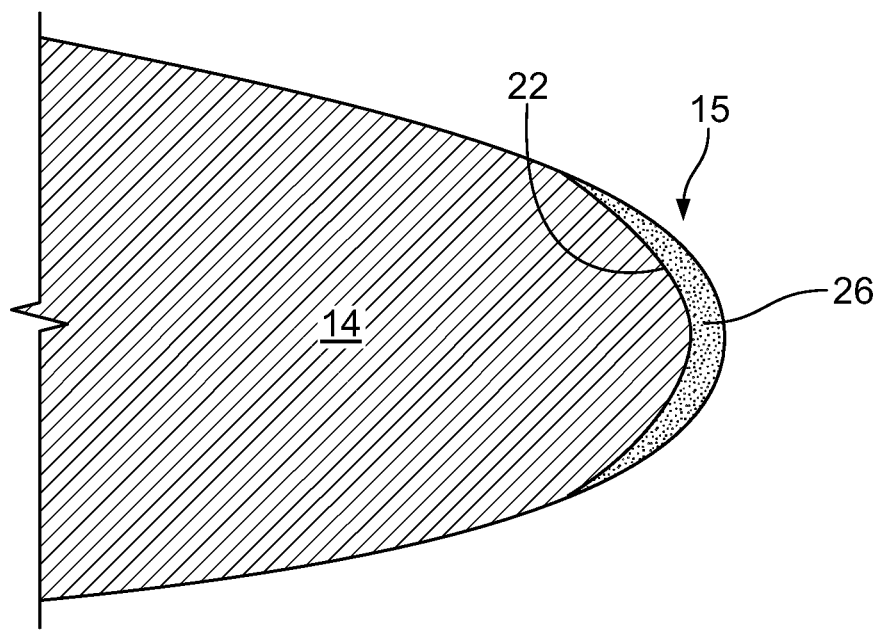
FIG. 9 a schematic of the repaired surface of FIG. 8 of the present disclosure.

The deposited compositionally controlled protective coating 26 from steps 1011 and 1013 forms a metallurgical bond with the workpiece 12 that by nature, has a high bond strength and structural integrity, see FIG. 9. The deposited compositionally controlled protective coating 26 has a fine-grained microstructure. In one embodiment, inert shielding gas is used to protect the material deposits 32 from the electrode disk 40 from oxidation or other adverse reactions caused by atmospheric gases. When the electrode disk 40 is selected from nitinol, near equiatomic composition of Ni and Ti are maintained in the deposited compositionally controlled protective coating 26. The methods of repairing and coating as provided in FIG. 10 can be applied in the field to restore damage such as blade leading edge 15 erosion without removing the blades 14 from the turbine.

In one embodiment, the electrode disk 40 material is selected from nitinol. Nitinol alloy exhibits excellent erosion resistance, which is largely attributed to the super-elasticity of the alloy. Nitinol can have three different phases: austenite, martensite, and stress induced martensite. Nitinol assumes austenite microstructure at high temperature and spontaneously transforms to martensite microstructure by cooling to a lower temperature. Nitinol will also transform its microstructure from austenite to martensite, more precisely, stress induced martensite, when stress is applied to the alloy. The phase transformation of the alloy is accompanied with reversible shape change or elasticity. As soon as the stress is removed, nitinol will instantaneously revert to austenite and its original shape. This characteristic enables nitinol to behave like a super spring and have super elasticity capability. The super-elasticity feature of the protective nitinol coating 26 deposited on the leading edge 15 of blade surface or prepared surface 22 by the electro-spark deposition process absorbs the impinging energy of water droplets and particles without occurring permanent plastic deformation or breaking and provides erosion protection. Normally, nitinol exhibits superelastic properties in the temperature range of −20 to +60° C. Nitinol exhibits superelasticity only at a narrow temperature range, approximately 0 to 40° C., above its austenite transformation finish temperature ($A_f$). To achieve excellent erosion resistance, the nitinol coating must have a precise composition, which allows the nitinol coating to possess super-elasticity at the blade operating temperature range. For gas turbine first stage compressor blades, for instance, the normal operating temperature is around 0 to 35° C. A minor change in the composition of nitinol can alter its transformation temperature (i.e., $A_f$) significantly. Increasing the nickel content in nitinol reduces the alloy $A_f$ temperature. However, the $A_f$ temperature can be adjusted only to some extent. In one embodiment, the compositionally controlled protective coating 26 applied using the nitinol electrode disk 40 of the ESD process includes a nickel content of 50.2 to 50.8 atomic percent and the balance of titanium, with less than 0.1 atomic percent of total other residual elements. The austenite transformation temperature ($A_f$) of the nitinol coating is controlled in temperature range of 0 to +35° C.

One advantage of the ESD process of the present embodiment is that the electrical pulse has a short duration, which produces nano-structured coatings with unique tribological and corrosion performance caused by the very rapid solidification of the deposited material. An additional benefit is that ESD does not call for special surface-preparation techniques, deposition chambers, spray booths, or particular operator protections for most materials. Perhaps most significantly, the process releases very little, if any, hazardous wastes, fumes, or effluents.

The ESD process disclosed in the present disclosure causes almost no melting or interdiffusion of the parent metal of the workpiece 12, therefore allowing the composition of protective coating 26 to be highly controllable. In one embodiment, when the electrode disk 40 is selected from nitinol, the protective coating 26 deposited by ESD has a consistent composition, which is almost identical to the nitinol electrode composition. In one embodiment, the ESD process does not cause the heating of either the compositionally controlled the coating 26 or the blade 14. The ESD process of the present disclosure prevents does not result in a heat effected zone in blade 14. As such, the methods used in at least one embodiment of the present disclosure do not cause any distortion of the blade 14 during application. In an alternative embodiment, no post process heat treatment is required for erosion protection of the blade when the compositionally controlled protective coating 26 is deposited using the ESD process described herein.

One advantage of an embodiment of the present disclosure includes a portable coating device for use in the field to provide a compositionally controlled protective erosion resistant coating to gas turbine and steam turbine components subject to water and/or particle impingement wear.

Another advantage of an embodiment of the present disclosure includes a portable repair device available to use in the field to provide a protective restorative erosion resistant coating to gas turbine and steam turbine components subject to water and/or particle impingement wear.

Another advantage of an embodiment of the present disclosure includes a portable repair device available to use in the field that allows damaged gas turbine components and steam turbine components to be repaired without removing the components from the turbines.

Another advantage of an embodiment of the present disclosure is the protective erosion resistant coating obtained from the portable coating device produces a continuous, high quality deposition on irregular surfaces of the gas or steam turbine components.

Yet another advantage of an embodiment of the present disclosure is that the application of the compositionally controlled protective erosion resistant coating using the portable device does not thermally affect or distort the surface of the workpiece, thereby avoiding material property debits, heat affected zones, and unacceptable distortion to the gas or steam turbine component.

Another advantage of an embodiment of the present disclosure is that damaged gas or steam turbine components can be repaired instead of being completely replaced by new components resulting in a significant cost savings.

Yet another advantage of an embodiment of the present disclosure is that a reliable integral metallurgical bond is formed between the component base metal and the applied compositionally controlled protective coating, thereby producing a protective erosion resistant coating that does not spall off the surface of the coated component.

Another advantage of an embodiment of the present disclosure is that the compositionally controlled protective erosion resistant coating provides long lasting and reliable erosion protection.

Another advantage of an embodiment of the present disclosure is that the process is conducted at ambient temperature and does not require additional heating for the compositionally controlled coating to provide erosion resistant properties.

Another advantage of an embodiment of the present disclosure is obtaining a multi-layer compositionally controlled coating having the desired thickness on the surface of the component.

Yet another advantage of an embodiment of the present disclosure is a multi-coating system or functionally graded coating that allows intermediate bond coating bridging between the substrate and the erosion resistant coating.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for modifying a workpiece comprising:
providing the workpiece having a first surface;
preparing the first surface of the workpiece;
providing a portable coating device including:
electro-spark deposition (ESD) equipment, and
an ESD torch electrically connected with the ESD equipment, the ESD torch including:
an inert gas source;
a housing, the housing being arranged and disposed to contain and support an electrode disk holder therein, and position a torch cup removably attached to the housing;
an electrode disk including a conductive material, the electrode disk disposed within the electrode disk holder and removably attached to the electrode disk holder by a pin, the electrode disk shielded by an inert gas; and
a vibration source operably coupled with the electrode disk holder, the vibration source being arranged and disposed to linearly vibrate the electrode disk holder independent of the housing, the linear vibration of the electrode disk holder extending the electrode disk from and retracting the electrode disk within the torch cup to create an air gap between the electrode disk and the workpiece; and
rolling the electrode disk of the ESD torch over the first surface, the rolling comprising creating an air gap between the electrode disk and the workpiece by vibrating the electrode holder within the housing, the vibration source providing the vibrating of the electrode holder;
wherein rolling deposits the conductive material from the electrode disk onto the first surface to form a compositionally controlled protective coating over the first surface of the workpiece; and
wherein the compositionally controlled protective coating forms a metallurgical bond with the first surface of the workpiece.

2. The method of claim 1, wherein the step of rolling is repeated until a desired coating thickness is obtained.

3. The method of claim 1, wherein the inert gas is helium, argon or a combination thereof.

4. The method of claim 1, wherein the electrode disk comprises nitinol.

5. The method of claim 2, wherein the desired coating thickness is approximately 50.8 microns to approximately 127 microns.

6. The method of claim 1, wherein the workpiece is selected from gas turbine components and steam turbine components including gas turbine compressor blades, gas turbine blade leading edges, gas turbine dovetail load bearing surfaces, steam turbine compressor blades, steam turbine blade leading edges, and steam turbine dovetail load bearing surfaces.

7. The method of claim 1, wherein the compositionally controlled protective coating comprises approximately 50.2 to approximately 50.8 atomic percent nickel and balance titanium.

8. A method for coating a workpiece comprising:
providing the workpiece having a surface;
providing a portable coating device comprising:
electro-spark deposition (ESD) equipment, and
an ESD torch electrically connected to the ESD equipment, the ESD torch including:
an inert gas source;
a vibration source;
a housing;
an electrode disk holder, contained within the housing; and
an electrode disk including a conductive material, the electrode disk disposed within the electrode disk holder and removably attached to the electrode disk holder by a pin, the electrode disk operably coupled with the vibration source and shielded by an inert gas, wherein electrode disk applies a compositionally controlled protective coating to the surface of the workpiece;
rolling the electrode disk of the ESD torch over the surface; and
linearly vibrating the electrode disk holder independent of the housing during the rolling of the electrode disk, the linearly vibrating extending the electrode disk from and retracting the electrode disk within the ESD torch, creating an air gap between the electrode disk and the surface of the workpiece;
wherein rolling the electrode disk and linearly vibrating the electrode disk holder deposits the conductive material from the electrode disk onto the surface to form the compositionally controlled protective coating;
wherein the compositionally controlled protective coating forms a metallurgical bond with the surface of the workpiece; and
wherein the rolling the electrode disk of the ESD torch over the surface does not cause heating sufficient to form a heat effected zone.

9. The method of claim 8, wherein the step of rolling is repeated until a desired coating thickness is obtained.

10. The method of claim 8, further including a step of optionally preparing the surface of the workpiece, wherein the step of optionally preparing the surface optionally includes cleaning the surface.

11. The method of claim 8, further including polishing the compositionally controlled protective coating to obtain a smooth finish.

12. The method of claim 8, wherein the electrode disk is selected from nitinol, conductive cobalt based alloys, and conductive carbides.

13. The method of claim 8, wherein the compositionally controlled protective coating thickness is approximately 50.8 microns to approximately 127 microns.

14. The method of claim 8, wherein the compositionally controlled protective coating comprises approximately 50.2 to approximately 50.8 atomic percent nickel and balance titanium.

15. The method of claim 8, wherein the workpiece is selected from gas turbine components and steam turbine components including gas turbine compressor blades, gas turbine blade leading edges, gas turbine dovetail load bearing surfaces, steam turbine compressor blades, steam turbine blade leading edges, and steam turbine dovetail load bearing surfaces.

16. The method of claim 1, wherein the torch cup further comprises guides for operation of the ESD torch, the guides being arranged and disposed to contact the workpiece and allow the electrode disk and the ESD torch to follow a contour of the workpiece.

17. The method of claim 1, wherein the torch cup further comprises a contoured opening dimensioned to substantially conform to the workpiece.

18. The method of claim 1, further comprising a spring operably coupled with the vibration source, the spring arranged and disposed to provide the linear vibration.

* * * * *